(No Model.)
W. J. TRIPP.
BALL BEARING.
No. 598,402. Patented Feb. 1, 1898.
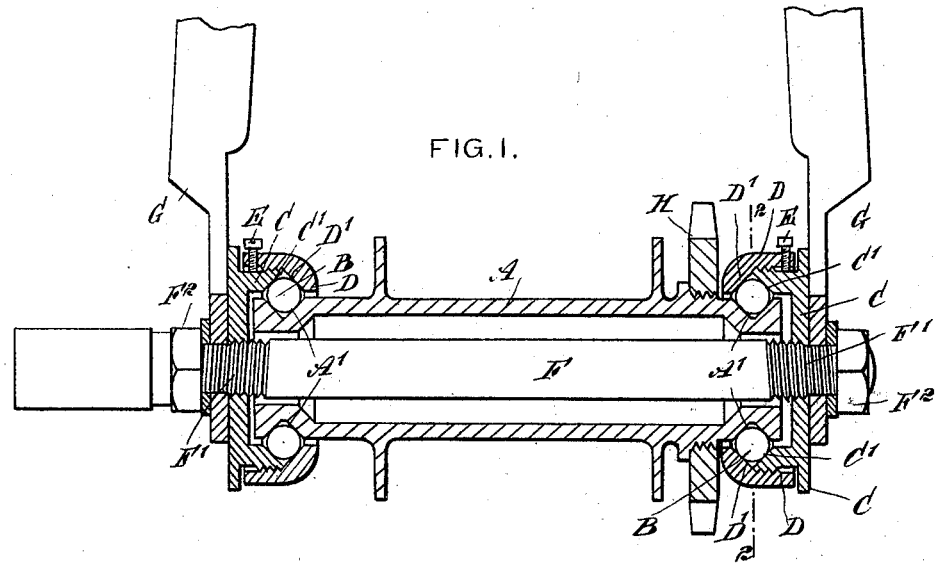
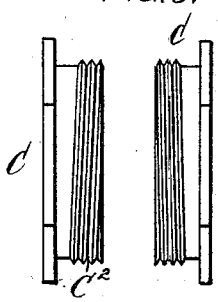
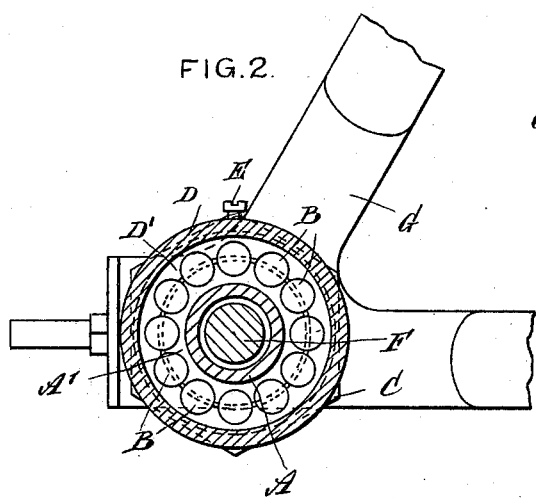
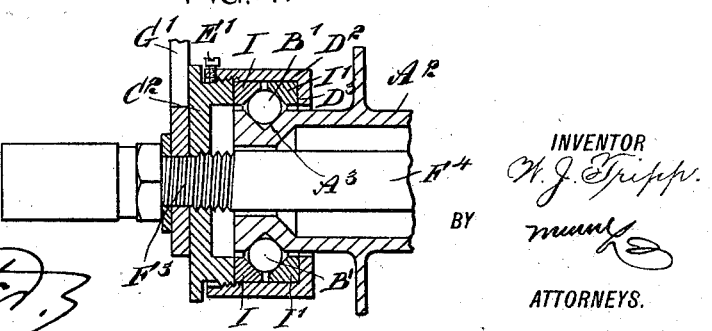
WITNESSES:
Donn Turtchell
Geo. J. Hosted
INVENTOR
W. J. Tripp
BY
ATTORNEYS.

UNITED STATES PATENT OFFICE.

WILLIAM JAY TRIPP, OF NEW YORK, N. Y.

BALL-BEARING.

SPECIFICATION forming part of Letters Patent No. 598,402, dated February 1, 1898.

Application filed January 4, 1897. Serial No. 617,918. (No model.)

*To all whom it may concern:*

Be it known that I, WILLIAM JAY TRIPP, of New York city, in the county and State of New York, have invented a new and Improved Ball-Bearing, of which the following is a full, clear, and exact description.

The object of the invention is to provide a new and improved ball-bearing designed for use on bicycles and other machines and devices and which is simple and durable in construction and arranged to reduce the friction to a minimum and to permit of readily adjusting the several parts and have ready access thereto for repairs and the like.

The invention consists of certain parts and combinations, as will be fully described hereinafter and then pointed out in the claim.

Reference is to be had to the accompanying drawings, forming a part of this specification, in which similar characters of reference indicate corresponding parts in all the figures.

Figure 1 is a sectional side elevation of the improvement as applied to a bicycle-wheel. Fig. 2 is a cross-section of the same on the line 2 2 of Fig. 1. Fig. 3 is a side elevation of the stationary collars forming part of the ball-race. Fig. 4 is a sectional side elevation of a modified form of the improvement.

As illustrated in Figs. 1 and 2, the hub A of one of the wheels of the bicycle is provided near its ends with external annular grooves A', preferably made V-shaped and each forming part of a ball-race for the balls B, engaged by the annular bevels C' and D' of rings or collars C and D, respectively, so that a complete ball-race, square in cross-section, is formed for the said balls to travel in. The collar C is formed with an external screw-thread $C^2$, on which screws the internal thread of the other collar D, and both are locked together by a set-screw E. The threads of the two collars C at the ends of the hub A are preferably made right and left hand, as plainly indicated in Fig. 1, so as to prevent accidental unscrewing of the said collars when the several parts are in place, the collars C on the reduced threaded ends F' of the axle F extending loosely through the hollow hub A and supporting at its outer ends the frame G of the bicycle or other vehicle, the said frame fitting snugly against the outer faces of the collars C, so as to hold the several parts in position. The frame parts are held in place on the axle F by washers and nuts $F^2$, as plainly indicated in the drawings.

Now it will be seen that by the arrangement described the collars C and D can be adjusted one upon the other, so as to form a proper V-shaped annular groove for the outer portions of the balls B to travel in, and as the collars C are adjustably held by screwing on the axle F it is evident that the two collars can be adjusted lengthwise relatively to the position of the balls in the annular groove A' of the hub A. Furthermore, ready access can be had to any of the parts for repairing or other purposes.

The threads F' on the axle F are preferably right and left hand to engage corresponding threads in the collars C, and as the latter have external right and left threads it is evident that after the parts are once adjusted there is no liability of their becoming accidentally detached or loosened.

As illustrated in Fig. 4, the hub $A^2$ of the wheel is formed with an annular groove $A^3$ at each end for the balls B' to travel in, the said balls being engaged by two rings I I', clamped in a collar $D^2$, screwing on a collar $C^2$, and secured thereto by a set-screw E', similarly to the collars C and D above referred to. The collar $C^2$ screws in turn on the reduced end $F^3$ of an axle $F^4$, which also supports the frame G'. The inner end of the collar $C^2$ abuts against the ring I, and the other ring I' rests against a flange $D^3$, extending inwardly from the inner end of the collar $D^2$, so that the two rings I I' are securely held in the collar $D^2$ and can be adjusted therein when it is necessary to take up wear by screwing up the collar $C^2$.

Now it is evident that in all the cases described the revolving part of the bearing is formed with an annular groove forming part of a ball-race, the other portion of which is formed by the beveled edges of collars or rings surrounding the revolving part.

Having thus fully described my invention, I claim as new and desire to secure by Letters Patent—

The combination of an axle, two collars secured to the axle, each collar having an inwardly-overhanging portion, an additional collar carried on each overhanging portion of the first-named collar, the said additional collars extending inward beyond the collars on which they are carried and being contracted at points inward of the said collars on which they are carried, the pairs of collars, one pair being at each end of the axle, forming an annular ball-race, a hub mounted to turn freely on the axle, the ends of the hub being respectively projected within the two aforesaid additional collars and within the overhanging portions of the first-named collars, and balls running in the aforesaid raceways and bearing on the outer side of the hub.

WILLIAM JAY TRIPP.

Witnesses:
 THEO. G. HOSTER,
 JNO. M. RITTER.